(12) United States Patent
Fowler

(10) Patent No.: US 6,471,280 B1
(45) Date of Patent: Oct. 29, 2002

(54) VEHICLE CANOPY SYSTEM

(76) Inventor: Bryan G. Fowler, P.O. Box 951, Eatonville, WA (US) 98328

( * ) Notice: Subject to any disclaimer, the term of this patent is extended or adjusted under 35 U.S.C. 154(b) by 0 days.

(21) Appl. No.: 09/865,350

(22) Filed: May 25, 2001

(51) Int. Cl.[7] .................................................. B60P 7/02
(52) U.S. Cl. .................... 296/100.04; 296/164; 280/756
(58) Field of Search .................. 296/156, 10, 164, 296/166, 167, 100.02, 100.04; 280/756

(56) References Cited

U.S. PATENT DOCUMENTS

| | | | | |
|---|---|---|---|---|
| 2,828,970 A | * | 4/1958 | Ivey ............................ | 280/756 |
| 3,897,100 A | * | 7/1975 | Gardner ........................ | 296/10 |
| 4,095,313 A | | 6/1978 | Piljay | |
| 4,202,579 A | * | 5/1980 | Berggren ..................... | 296/156 |
| 4,294,485 A | * | 10/1981 | Engelhard ................... | 296/166 |
| D263,984 S | | 4/1982 | Moss | |
| 4,688,845 A | | 8/1987 | Kingsley | |
| 4,988,141 A | | 1/1991 | Takada | |
| 5,174,622 A | | 12/1992 | Gutta | |
| 5,228,739 A | * | 7/1993 | Love ........................ | 296/167 X |
| 5,882,063 A | | 3/1999 | Job | |

FOREIGN PATENT DOCUMENTS

JP         404310448    * 11/1992    ................ 280/756

* cited by examiner

Primary Examiner—Dennis H. Pedder

(57) ABSTRACT

A vehicle canopy system for providing a removable canopy and roll bar system for safety and cover of a vehicle bed. The vehicle canopy system includes a roll bar assembly adapted for mounting to a bed of a pickup truck, a canopy member that is removably couplable to said roll bar assembly and adapted for resting on a top edge of side walls of a vehicle, and a pair of elastomeric members that are positionable between the canopy member and the top edge of the side walls. The elastomeric members are for restricting the flow of air and moisture between the top edge of the side walls and the canopy member when the canopy member is positioned on the top edge of the side walls of the vehicle.

12 Claims, 3 Drawing Sheets

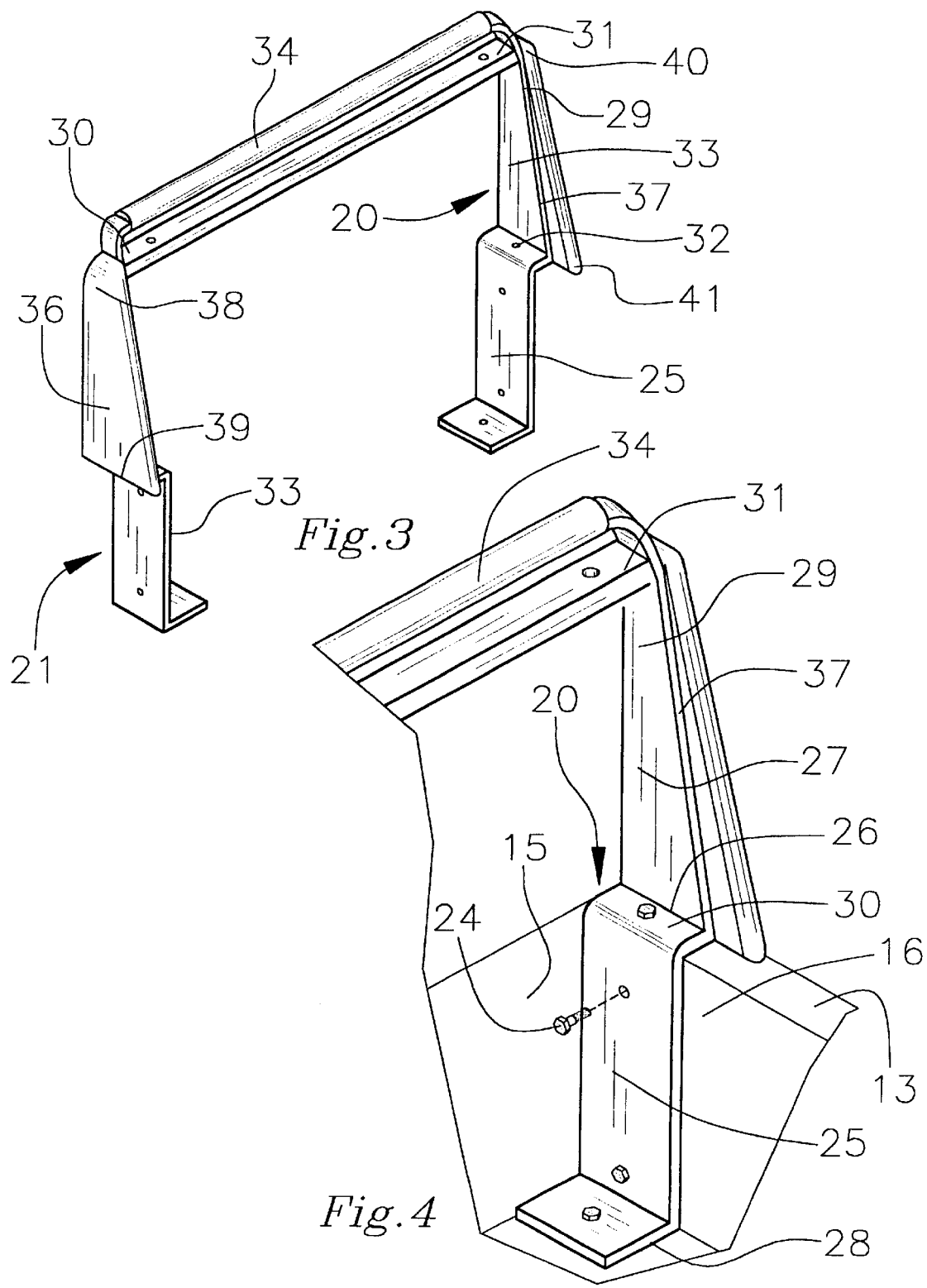

ively in the drawings. The invention is capable of other embodiments and of being practiced and carried out in various ways. Also, it is
VEHICLE CANOPY SYSTEM

BACKGROUND OF THE INVENTION

1. Field of the Invention

The present invention relates to vehicle bed accessories and more particularly pertains to a new vehicle canopy system for providing a removable canopy and roll bar system for safety and cover of a vehicle bed.

2. Description of the Prior Art

The use of vehicle bed accessories is known in the prior art. More specifically, vehicle bed accessories heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. Nos. 4,988,141; 4,095, 313; 5,882,063; U.S. Pat. No. Des. 263,984; U.S. Pat. Nos. 5,174,622; and 4,688,845.

While these devices fulfill their respective, particular objectives and requirements, the aforementioned patents do not disclose a new vehicle canopy system. The inventive device includes a roll bar assembly adapted for mounting to a bed of a pickup truck, a canopy member that is removably couplable to said roll bar assembly and adapted for resting on a top edge of side walls of a vehicle, and a pair of elastomeric members that are positionable between the canopy member and the top edge of the side walls. The elastomeric members are for restricting the flow of air and moisture between the top edge of the side walls and the canopy member when the canopy member is positioned on the top edge of the side walls of the vehicle.

In these respects, the vehicle canopy system according to the present invention substantially departs from the conventional concepts and designs of the prior art, and in so doing provides an apparatus primarily developed for the purpose of providing a removable canopy and roll bar system for safety and cover of a vehicle bed.

SUMMARY OF THE INVENTION

In view of the foregoing disadvantages inherent in the known types of vehicle bed accessories now present in the prior art, the present invention provides a new vehicle canopy system construction wherein the same can be utilized for providing a removable canopy and roll bar system for safety and cover of a vehicle bed.

The general purpose of the present invention, which will be described subsequently in greater detail, is to provide a new vehicle canopy system apparatus and method which has many of the advantages of the vehicle bed accessories mentioned heretofore and many novel features that result in a new vehicle canopy system which is not anticipated, rendered obvious, suggested, or even implied by any of the prior art vehicle bed accessories, either alone or in any combination thereof.

To attain this, the present invention generally comprises a roll bar assembly adapted for mounting to a bed of a pickup truck, a canopy member that is removably couplable to said roll bar assembly and adapted for resting on a top edge of side walls of a vehicle, and a pair of elastomeric members that are positionable between the canopy member and the top edge of the side walls. The elastomeric members are for restricting the flow of air and moisture between the top edge of the side walls and the canopy member when the canopy member is positioned on the top edge of the side walls of the vehicle.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new vehicle canopy system apparatus and method which has many of the advantages of the vehicle bed accessories mentioned heretofore and many novel features that result in a new vehicle canopy system which is not anticipated, rendered obvious, suggested, or even implied by any of the prior art vehicle bed accessories, either alone or in any combination thereof.

It is another object of the present invention to provide a new vehicle canopy system, which may be easily and efficiently manufactured and marketed.

It is a further object of the present invention to provide a new vehicle canopy system, which is of a durable and reliable construction.

An even further object of the present invention is to provide a new vehicle canopy system which is susceptible of a low cost of manufacture with regard to both materials and labor, and which accordingly is then susceptible of low prices of sale to the consuming public, thereby making such vehicle canopy system economically available to the buying public.

Still yet another object of the present invention is to provide a new vehicle canopy system which provides in the apparatuses and methods of the prior art some of the advantages thereof, while simultaneously overcoming some of the disadvantages normally associated therewith.

Still another object of the present invention is to provide a new vehicle canopy system for providing a removable canopy and roll bar system for safety and cover of a vehicle bed.

Yet another object of the present invention is to provide a new vehicle canopy system which includes a roll bar assembly adapted for mounting to a bed of a pickup truck, a canopy member that is removably couplable to said roll bar assembly and adapted for resting on a top edge of side walls of a vehicle, and a pair of elastomeric members that are positionable between the canopy member and the top edge of the side walls. The elastomeric members are for restricting the flow of air and moisture between the top edge of the side walls and the canopy member when the canopy member is positioned on the top edge of the side walls of the vehicle.

Still yet another object of the present invention is to provide a new vehicle canopy system that provides a lighter canopy system that allows a user to attach and remove the canopy system with little strength or effort.

Even still another object of the present invention is to provide a new vehicle canopy system that combines a lightweight canopy system with the safety advantage of a roll bar assembly.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein:

FIG. 3 is a schematic perspective view particularly illustrating the roll bar assembly of the present invention.

FIG. 4 is a schematic perspective view particularly illustrating the use of the roll bar assembly with a vehicle.

DESCRIPTION OF THE PREFERRED EMBODIMENT

Figure 1:
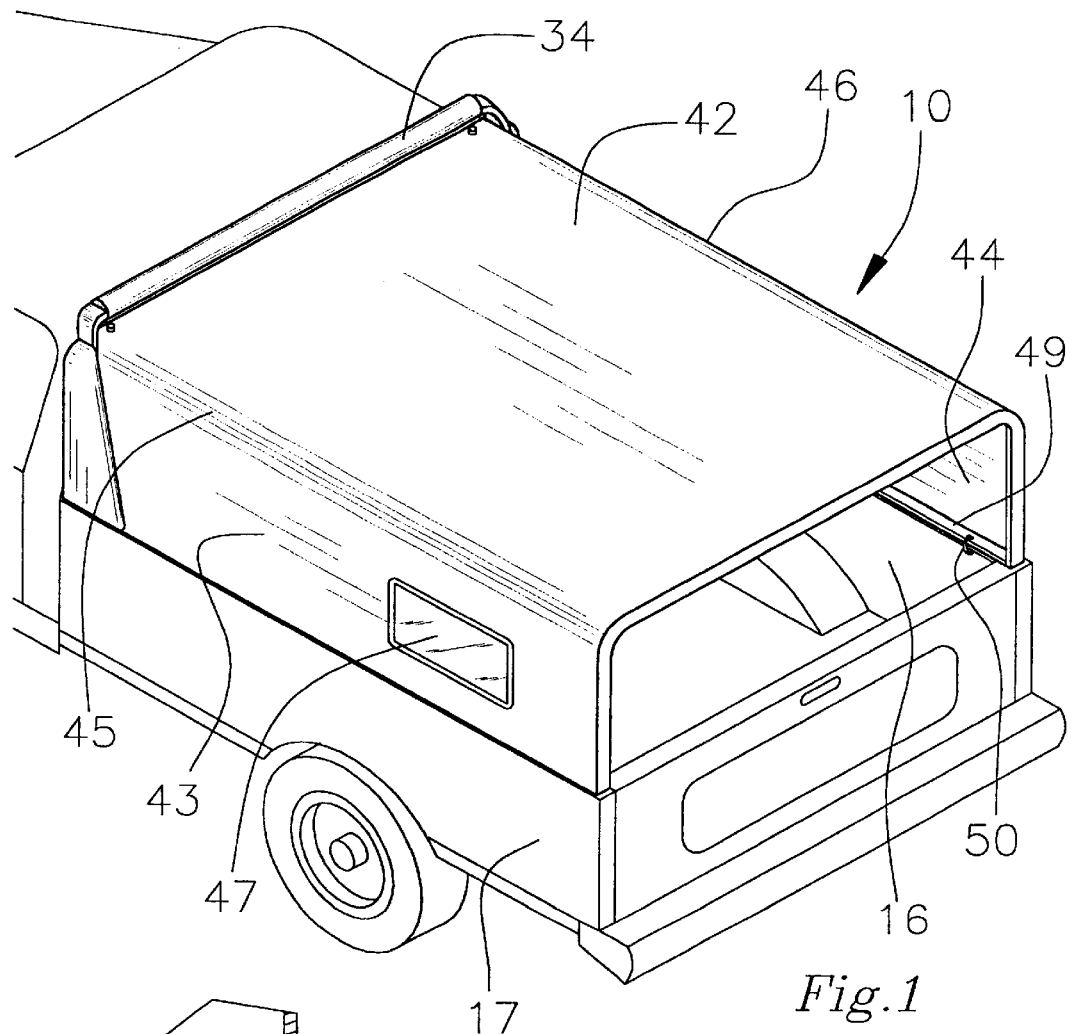
FIG. 1 is a schematic perspective view of a new vehicle canopy system according to the present invention.
Figure 2:
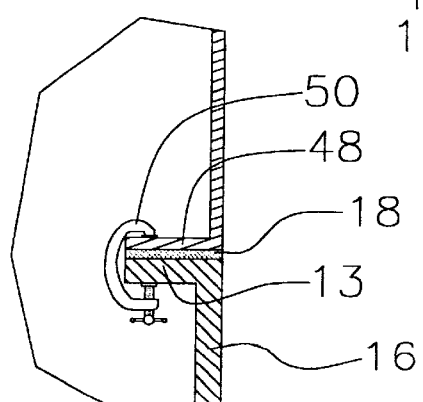
FIG. 2 is a schematic side view particularly illustrating the attachment system of the present invention.
Figure 5:
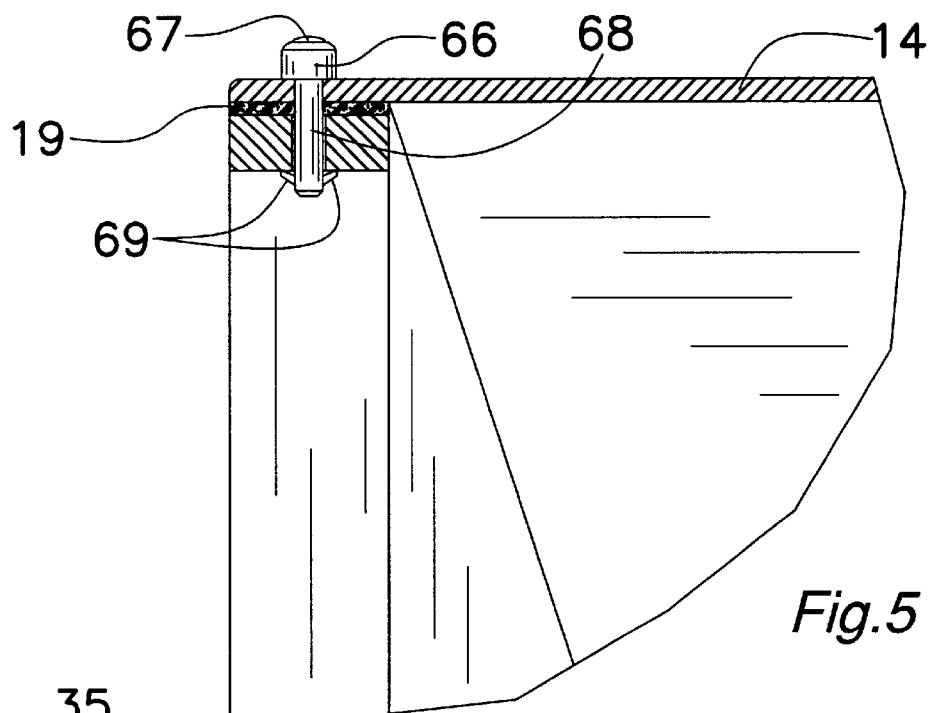
FIG. 5 is a schematic side view of particularly illustrating an attachment assembly of the present invention.
Figure 6:
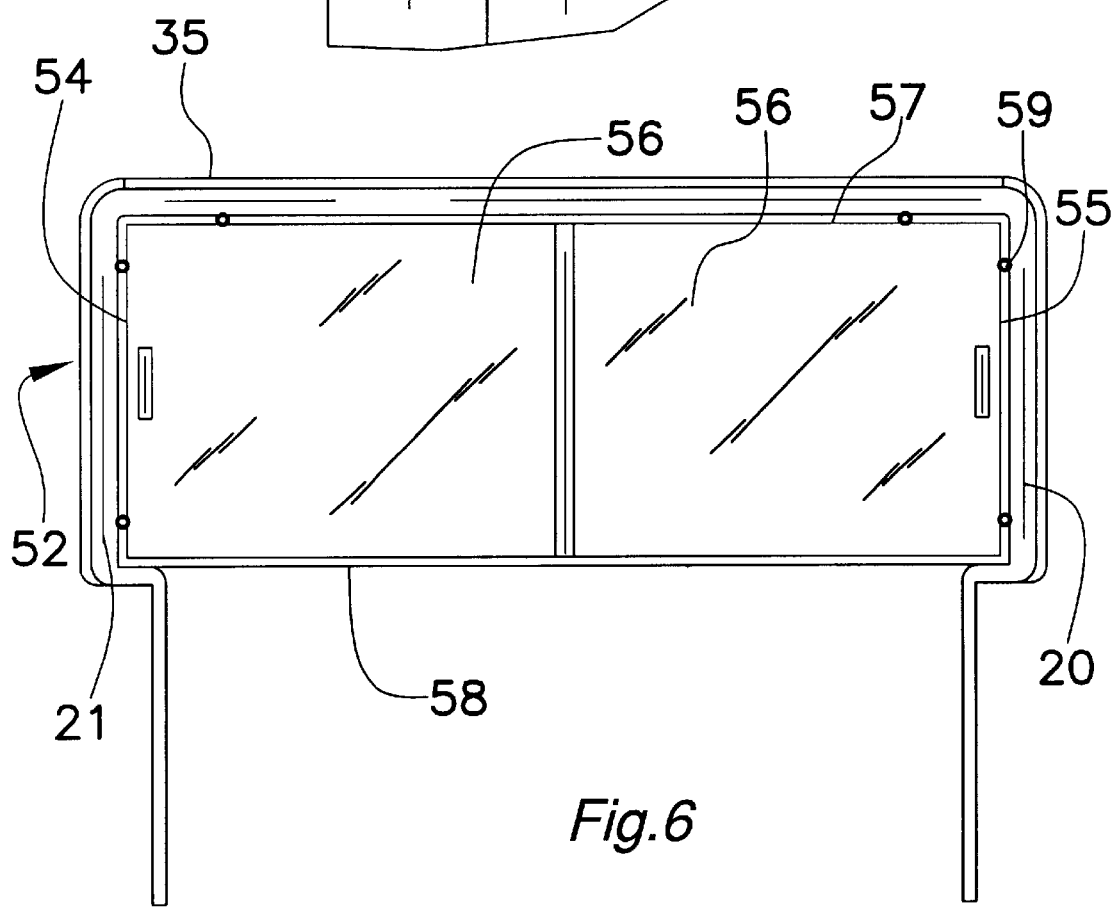
FIG. 6 is a schematic perspective view of an optional embodiment of the present invention including a removable sliding window.

With reference now to the drawings, and in particular to FIGS. 1 through 6 thereof, a new vehicle canopy system embodying the principles and concepts of the present invention and generally designated by the reference numeral 10 will be described.

As best illustrated in FIGS. 1 through 6, the vehicle canopy system 10 generally comprises a roll bar assembly 12, a canopy member 14 and a pair of elastomeric members 18, 19. The roll bar assembly 12 is adapted for mounting to a bed 11 of a vehicle. The canopy member 14 is removably couplable to the roll bar assembly 12 and is adapted for resting on a top edge 13 of side walls 16, 17 of a bed 11 of a vehicle.

The elastomeric members 18, 19 are positionable between the canopy member 14 and the top edge 13 of the side walls 16,17. The elastomeric members 18, 19 are for restricting the flow of air and moisture between the top edge 13 of the side walls 16, 17 and the canopy member 14 when the canopy member 14 is positioned on the top edge 13.

The roll bar assembly 12 has a pair of upright members 20, 21. The upright members 20, 21 have a plurality of apertures 22 extending therethrough. Each of the upright members 20, 21 is positioned adjacent to a corner formed by an abutment of an associated side wall 16, 17 and a front wall 15 of the vehicle.

Each of the side walls 16, 17 have a plurality of side wall apertures 23. Each of the plurality of side wall apertures 23 is substantially aligned with an associated one of the apertures of the upright members 20, 21.

The roll bar assembly further comprises a plurality of connecting members 24. Each of the connecting members 24 are adapted for inserting through an associated upright member aperture 22 and an associated side wall aperture 23 for coupling the roll bar assembly 12 to a bed portion 11 of the vehicle.

Each of the upright members 20, 21 has a first portion 25, a medial portion 26 and a second portion 27. The first portion 25 has a first portion bottom end 28 and a first portion top end 29. The first portion bottom end 28 abuts a floor of the bed portion 11 when the upright members 20, 21 are coupled to the side walls 16, 17.

The first portion 25 has a plurality of apertures 22. Each of the apertures 22 is for receiving an associated one of the plurality of connecting members 24.

The medial portion 26 has a first end 30 and a second end 31. The medial portion first end 30 is integrally coupled to the first portion top end 29. The medial portion 26 is positioned such that a longitudinal axis of the medial portion 26 is substantially perpendicular to a longitudinal axis of the first portion 25.

The medial portion 26 is for resting upon the top edge 13 of the side walls 16, 17. The medial portion 26 has an aperture 32. The aperture 32 is for receiving an associated one of the plurality of connecting members 24.

The second end 31 of the medial portion 26 is integrally coupled to a first end of the second portion 27. The second portion 27 is positioned such that a longitudinal axis of the second portion 27 is substantially perpendicular to a longitudinal axis of the medial portion 26 and the longitudinal axis of the second portion 27 is substantially parallel with the longitudinal axis of the first portion 25.

The second portion 27 of each of the upright members 20, 21 has an exterior face 33. The second portion 27 is positioned such that the exterior face 33 is substantially coplanar with an exterior surface of the side walls 16, 17.

The invention further comprises a crossbar member 34. The crossbar member 34 extends between a second end of the second portion 27 of a first one of the pair of upright members 20, 21 to a second end of the second portion 27 of a second one of the pair of upright members 20, 21.

The invention further comprises a pair of shield portions 36, 37. Each one of the pair of shield portions 36, 37 is coupled to the second portion 27 of an associated one of the upright members 20, 21. The shield portions 36, 37 are for restricting the flow of air and moisture into an interior defined by the bed portion 11 of the vehicle and the canopy member 14 when the canopy member 14 is resting upon the side walls 16, 17.

Each of the shield portions 36, 37 has a top edge 38 and a bottom edge 39. The top edge 38 has a length. The bottom edge 39 has a length substantially greater that the length of the top edge 38 such that each shield portion 36, 37 has a substantially trapezoidal form.

The canopy member 14 comprises a top portion 42 and a pair of side portions 43, 44. The top portion 42 is adapted for positioning above the bed portion 11 in a substantially parallel spaced relationship. The top portion has a pair of side edges 45, 46.

Each one of the pair of side portions 43, 44 extends downwardly from an associated side edge 45, 46 of the top portion 42. Each side portion 43, 44 is positioned such that a plane defined by an interior surface of each side portion is substantially perpendicular to a plane defined by an interior surface of the top portion 42. At least one of the pair of side portions 43, 44 may have a window 47.

Each of the pair of side portions 43, 44 has a flange member 48, 49. Each flange member 48, 49 is for resting each side portion 43, 44 on the top edge 13 of the side walls 16, 17. Each flange member 48, 49 is positioned such that the flange member 48, 49 is in a substantially parallel spaced relationship with the top portion 42.

The canopy member 14 further includes a plurality of clamp members 50. Each one of the plurality of clamp members 50 is positioned around a perimeter edge of an associated flange member 48, 49. Each one of the clamp members 50 is designed for providing a clamping force between the flange members 48, 49 of the canopy member 14 and the top edge 13 of the side walls 16, 17 whereby the canopy member 14 is coupled to the bed portion 11 of the vehicle.

One embodiment of the invention may include a window assembly 52. The window assembly 52 comprises a frame assembly and a pane member 56. The frame assembly has a pair of side members 54, 55. The side members 54, 55 are positioned in a substantially parallel spaced relationship.

The frame assembly 53 has a pair of end members 57, 58. The end members 57, 58 are positioned in a substantially parallel spaced relationship. The end members 57, 58 extend between the side members 54, 55 of the frame assembly 53.

The frame assembly 53 is substantially rectangular. The frame assembly 53 forms a perimeter wall for receiving the pane member 56.

The window assembly 52 is coupled to the roll bar assembly 12 such that the window assembly 52 extends in a plane defined by the front wall 15 of the bed portion 11. The second portion 27 of each of the upright members 20, 21 has a plurality of apertures 59. The frame assembly 53 has a plurality of frame apertures 59. Each one of the frame apertures 59 is aligned with an associated one of the plurality of apertures of the second portion 27.

The invention further comprises a plurality of connecting members 60. Each one of the plurality of connecting members 60 is insertable into an associate frame aperture 59 and an associated second portion 27 aperture for removably coupling the frame assembly 53 to the roll bar assembly 12.

Each of the side members 54, 55 has a first groove 61 positioned substantially parallel to a longitudinal axis of the side member. Each of the side members 54, 55 has a second groove 62 positioned substantially parallel of a longitudinal axis of the side member 54, 55. The first 61 and second 62 grooves are positioned in a substantially parallel spaced relationship. The first 61 and second 62 grooves form a track portion.

The invention further comprises a pair of pane members 56. A first one of the pane members 56 is positioned such that a perimeter edge of the pane first pane member is in the first groove 61. A second pane member is positioned such a perimeter edge of the second pane member is in the second groove 62. The pane members are slideable in the grooves 61, 62 such that access from a cab portion of the vehicle is obtainable by sliding a pane member along an associated groove when the canopy member 14 is positioned on the side walls 16, 17.

The connecting members 60 have a head portion 66, a rod portion, a shaft portion 68, and a plurality of prongs 69. The shaft portion 68 is hollow. The rod portion 67 has a first end and a second end.

The first end 70 is adapted for slidably inserting into the shaft portion 68. The rod portion 67 is depressable in an aperture of the head portion for releasing the connecting member 60. The second end 71 of the rod portion 67 is coupled to a plurality of prongs 69 for retaining the connecting member 60 in a locking position. The plurality of prongs 69 is coupled to the rod portion 71 such that the plurality of prongs 69 is perpendicular to the rod portion 71 when in a connecting position and the plurality of prongs 69 is parallel to the rod portion 71 when in a releasing position.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A vehicle canopy system comprising:
 a vehicle, said vehicle having a bed portion, said bed portion having a floor, a front wall, and a pair of side walls;
 a roll bar assembly, said roll bar assembly being adapted for mounting to a bed of a pickup truck;
 a canopy member, said canopy member being removably couplable to said roll bar assembly, said canopy member being adapted for resting on a top edge of said side walls of said vehicle;
 a pair of elastomeric members, said elastomeric members being positionable between said canopy member and said top edge of said side walls, said elastomeric members being for restricting the flow of air and moisture between said top edge of said side walls and said canopy member when said canopy member is positioned on said top edge;
 said roll bar assembly having a pair of upright members each having a first portion, a medial portion, and a second portion, said upright members having a plurality of apertures extending therethrough and being located in said first and medial portions;

each of said upright members being positioned adjacent a corner formed by an abutment of an associated side wall and said front wall;

said side walls having a plurality of side wall apertures, each of said plurality of side wall apertures being substantially aligned with an associate one of said apertures of said upright members;

a plurality of connecting members, each of said plurality of connecting members being insertable through an associated aperture and an associated side wall aperture for coupling said roll bar assembly to said bed portion of said vehicle;

said first portion having a first portion bottom end and a first portion top end, said first portion bottom end abutting said floor of said bed portion when said upright members being coupled to said side walls;

said apertures of said first portion each being for receiving an associated one of said plurality of coupling members;

said medial portion having a first end and a second end, said medial portion first end being integrally coupled to said first portion top end, said medial portion being positioned such that a longitudinal axis of said medial portion being substantially perpendicular to a longitudinal axis of said first portion;

said medial portion being for resting upon said top edge of said side walls, one said aperture in said medial portion being for receiving an associated one of said plurality of connecting members;

said second end of said medial portion being integrally coupled to a first end of said second portion, said second portion being positioned such that a longitudinal axis of said second portion being substantially perpendicular to a longitudinal axis of said medial portion and said longitudinal axis of said second portion being substantially parallel with said longitudinal axis of said first portion.

2. The vehicle canopy system of claim 1, further comprising:

said second portion of each of said upright members having an exterior face, said second portion being positioned such that said exterior face is substantially coplanar with an exterior surface of said side walls.

3. The vehicle canopy system of claim 1, further comprising:

a crossbar member, said crossbar member extending between a second end of said second portion of a first one of said pair of upright members, to a second end of said second portion of a second one of said pair of upright members.

4. The vehicle canopy system of claim 2, further comprising:

a pair of shield portions, each one of said pair of shield portions being coupled to said second portion of an associated one of said upright members, said shield potion being for restricting the flow of air and moisture into an interior defined by said bed portion of said vehicle and said canopy member when said canopy member is resting upon said side walls.

5. The vehicle canopy system of claim 4, further comprising:

each of said shield portions having a top end and a bottom edge, said top edge having a length, said bottom edge having a length substantially greater that said length of said top edge such that said shield portion having a substantially trapezoidal form.

6. The vehicle canopy system of claim 1, further comprising:

said canopy member comprising a top portion and a pair of side portions, said top portion being adapted for positioning above said bed portion in a substantially parallel spaced relationship;

said top portion having a pair of side edges, each one of said pair of side portions extending downwardly from an associated side edge of said top portion, each side portion being positioned such that a plane defined by an interior surface of each side portion is substantially perpendicular to a plane defined by an interior surface of said top portion.

7. The vehicle canopy system of claim 6, further comprising:

wherein at least one of said pair of side portions having a window.

8. The vehicle canopy system of claim 6, further comprising:

each of said pair of side portions having a flange member, said flange member being for resting said side portion on said top edge of said side walls;

said flange member being positioned such that said flange member is in a substantially parallel spaced relationship with said top portion.

9. The vehicle canopy system of claim 8, further comprising:

a plurality of clamp members, each one of said plurality of clamp members being positioned around a perimeter edge of an associate flange member, each one of said clamp members providing a clamping force between said flange members of said canopy member and said top edge of said side walls whereby said canopy member being coupled to said bed portion of said vehicle.

10. The vehicle canopy system of claim 3, further comprising:

a window assembly, said window assembly comprising a frame assembly and a pane member;

said frame assembly having a pair of side members, said side members being positioned in a substantially parallel spaced relationship;

said frame assembly having a pair of end members, said end members being positioned in a substantially parallel spaced relationship;

said end members extending between said side members;

said frame assembly being substantially rectangular, said frame assembly forming a perimeter wall for receiving said pane member;

said window assembly being coupled to said roll bar assembly.

11. The vehicle canopy system of claim 10 further comprising:

said second portion of each of said upright members having a plurality of apertures;

said frame assembly having a plurality of frame apertures, each one of said frame apertures being aligned with an associated one of said plurality of apertures of said second portion;

a plurality of connecting members; each one of said plurality of connecting members being insertable into an associate frame aperture and an associated second portion aperture for removably coupling said frame assembly to said roll bar assembly.

12. The vehicle canopy system of claim 10, further comprising:

each of said side members having an first groove positioned substantially parallel of a longitudinal axis of said side member;

each of said side members an second groove positioned substantially parallel of a longitudinal axis of said side member; said first and second grooves being positioned in a substantially parallel spaced relationship;

said first and second grooves forming a track portion;

a pair of pane members, a first one of said pane members being positioned such that a perimeter edge of said first pane member being in said first groove, a second pane member being positioned such that a perimeter edge of said second pane member being in said second groove, said pane members being slideable in said grooves such that access from a cab portion of said vehicle is obtainable by sliding a pane member along an associated groove when said canopy member being positioned on said side walls.

\* \* \* \* \*